(12) United States Patent
Hirose et al.

(10) Patent No.: US 7,012,768 B2
(45) Date of Patent: Mar. 14, 2006

(54) OPTICAL PICK-UP

(75) Inventors: Kazuo Hirose, Mie (JP); Takumi Hayashi, Mie (JP); Kiyoshi Ishii, Tokyo (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/034,480

(22) Filed: Dec. 20, 2001

(65) Prior Publication Data
US 2002/0135893 A1   Sep. 26, 2002

(30) Foreign Application Priority Data

| Dec. 27, 2000 | (JP) | 2000-397357 |
| Mar. 28, 2001 | (JP) | 2001-093765 |
| Jun. 18, 2001 | (JP) | 2001-183771 |

(51) Int. Cl.
*G02B 7/02* (2006.01)

(52) U.S. Cl. .................... 359/822; 359/813; 369/44.17

(58) Field of Classification Search ............... 359/813, 359/819, 811, 821, 822, 823, 827; 369/44.17, 369/112.01, 112.24
See application file for complete search history.

(56) References Cited

U.S. PATENT DOCUMENTS

| 4,785,434 A | * | 11/1988 | Shoji et al. .................. 368/185 |
| 4,917,846 A | * | 4/1990 | Takase et al. ................ 264/130 |
| 5,830,940 A | * | 11/1998 | Nakamura et al. .......... 524/404 |
| 5,875,166 A | * | 2/1999 | Ikegame et al. ........ 369/112.23 |
| 6,075,114 A | * | 6/2000 | Umetsu et al. ............. 528/272 |
| 6,108,143 A | * | 8/2000 | Hirose et al. ................ 359/819 |
| 6,153,121 A | * | 11/2000 | Makabe et al. ......... 252/299.01 |
| 6,229,778 B1 | * | 5/2001 | Ikegame et al. .......... 369/53.22 |
| 6,375,863 B1 | * | 4/2002 | Tachikawa et al. .... 252/299.01 |

FOREIGN PATENT DOCUMENTS

| JP | 62245537 | | 10/1987 |
| JP | 6262237 | | 11/1987 |
| JP | 6027360 | | 2/1994 |
| JP | 06027360 A | * | 2/1994 |
| JP | 11-203699 | | 7/1999 |

* cited by examiner

Primary Examiner—Thong Nguyen
Assistant Examiner—Arnel C. Lavarias
(74) Attorney, Agent, or Firm—Fulbright & Jaworski L.L.P.

(57) ABSTRACT

An optical pick-up allows a lens to be supported at high dimensional accuracy for a high-density recording medium, and suppresses resonance for a high-speed access. The optical pick-up includes a supporting shaft, and a lens holder which fits on a supporting shaft rotatably, wherein the supporting shaft is formed of ceramics containing zirconia, and wherein the lens holder is formed of a liquid crystal resin composition. The optical-pickup includes a lens holder having a shaft hole which fits on a rotating shaft and a plurality of object lens holes, wherein the lens holder is a molded product of a resin composition of a liquid crystal resin or a polyphenylene ether resin mixed with a fibrous filler. The molded product has flexural elastic modulus of 10 GPa or more. The lens holder includes a bearing part formed vertically to a lens receiving surface with an excellent inner diameter roundness and excellent mechanical strength.

9 Claims, 10 Drawing Sheets

OPTICAL PICK-UP

BACKGROUND OF THE INVENTION

The present invention relates to an optical pick-up for use in an information recording/read apparatus.

There are various information recording/read apparatuses by optical means, including a video disc player, a digital audio player, an optical disc file, and the like. In recent years, a next generation DVD or CD having a storage capacity 2 to 6 times that of a current DVD having a storage capacity of 4.7 GB, or a current CD having a storage capacity of 700 MB; or an MO having a mass storage capacity have been developed. The optical information recording/read apparatus has an optical pick-up for detecting a signal track (information pit array) on a disc and information thereon.

The optical pick-up comprises a supporting shaft mounted on a base, and a lens holder rotatably supported on the supporting shaft. A bearing part is provided at the center of the lens holder, and an objective lens is installed on an eccentric position of the bearing part.

If the objective lens of the optical pick-up is dislocated in its optical axis (in radial direction of optical axis), it is impossible to condense optical beams on a correct position of the disc surface and thus impossible to read information correctly. Thus, normally, a focal dislocation of the objective lens is compensated by a focusing servo, and a dislocation of the signal track is compensated by a tracking servo.

In order to increase the density and the capacity of the optical disc, a track pitch and a length of the shortest pit are reduced. In such optical disc with high-density and mass storage capacity, the optical pick-up is required to have much higher response performance of a servo control, especially to have dimensional accuracy of the lens holder.

There is a lens holder on which a plurality of objective lens is mounted for sharing different media in one optical pick-up. In this case, the optical pick-up is required to have much higher sliding-contact characteristic between the lens holder and the supporting shaft, and rotational accuracy to switch one objective lens to another. The lens holder on which a plurality of objective lens is mounted is required to have much higher accuracy of an optical axis. Since a rotating angle becomes wide upon lens switching, and to improve a follow-up of a groove of the optical disc with high-density, it is also required to have much higher sliding-contact characteristic between the lens holder and the supporting shaft, and rotational accuracy. The objective lens and a balancer are mounted on the lens holder with the supporting shaft as the center, thereby deflecting and vibrating the lens holder upon a focus control. To stop the vibration rapidly, it is required to have high attenuation characteristic.

Typically, a conventional lens holder for the optical pick-up is produced by injection molding a resin material.

Referring to FIGS. 9 and 10, a method for forming the conventional lens holder will be described. A mold for injection molding includes a fixed template 16 and a moving template 17, and a cavity 18 is formed therebetween. The cavity 18 includes a cavity 18a for forming a lens supporting shaft, and a cavity 18b for forming a bearing part, and a core pin 19 penetrates the cavity 18b.

The lens holder is formed using the mold such that the core pin 19 is provided on the moving template 17, a tip of the core pin 19 is inserted into a depression 20 provided on the fixed template 16, the core pin 19 is fixed by the fixed template 16 and the moving template 17, and the resin material is injected through a gate. The gate is either pin point gates 21 in odd numbers shown in FIG. 9, or a side gate 22 shown in FIG. 10.

The lens holder obtained by the above-mentioned forming method cannot have a lens receiving surface and a bearing surface which are formed vertically. This is because a gap is formed between the moving template and the fixed template of the mold to prevent galling when the core pin is inserted, and the gap causes minor dislocation between the core pin provided on the moving template and the depression provided on the fixed template. Due to the dislocation, the core pin is inserted slantingly into the depression when the mold is closed. Accordingly, the lens holder thus formed has the lens receiving surface and the bearing surface which are not vertical. In the optical pick-up including such lens holder on which the lens receiving surface and the bearing surface are provided not vertically, optical beams passing through the objective lens cannot be focused on a disc surface, whereby it becomes difficult to write and detect information.

In addition, when the lens holder on which the lens receiving surface and the bearing surface are provided not vertically is used, it becomes difficult to fix the objective lens, resulting in low working efficiency and high number of defects.

Especially when the lens holder includes two or more of objective lenses, there is a problem that parallelism of lens receiving surfaces cannot be maintained with high accuracy. When the pin point gates 21 in odd numbers as shown in FIG. 9 are used to form the lens holder, a weld line is produced at about center between the gates to decrease roundness of the bearing surface. Therefore, a post-processing is needed to increase accuracy of the bearing part, which leads to problems such as decreased productivity, and increased manufacturing costs. On the other hand, when the material is injected from outside of the cavity 18 using the side gate 22 shown in FIG. 10, the material is injected with different pressures depending on areas, i.e., an area distant from the gate 22, and an area near the gate, resulting in an inaccurate lens receiving surface.

Japanese Patent Publication No. 2886741 describes a method for producing a lens holder, in which gates are provided so that a filler is oriented in an axis direction of an almost all bearing part.

According to the Japanese Patent Publication No. 2886741, it is required to use very small sprues and gate ports which provide the pin point gates around the bearing part with a bearing hole size of 1.0 to 2.0 mm for a light-weighted miniature lens holder currently available. When the sizes of sprues and gate ports are diminished, it becomes difficult to form the mold, and the resin material having a high elastic modulus may easily cause a short shot.

When the pin point gates are provided around the bearing part, and the resin material, especially a liquid crystal resin, is injected, the melted resin with which the bearing part is filled flows to a lens supporting part to easily induce a turbulent flow of the resin at an intersection (bridge portion) of the bearing part and the lens supporting part. As a result, mechanical strength may be decreased.

SUMMARY OF THE INVENTION

An object of the present invention is to provide a lens holder with excellent mechanical strength comprising a bearing part having a bearing surface with excellent roundness formed vertically to a lens receiving surface, and an optical pick-up using the lens holder.

Other object of the present invention is to provide an optical pick-up having extremely high lens supporting accuracy that can be used with high-density recording medium and capable of suppressing resonance caused by a high-speed access.

Still other object of the present invention is to provide an optical pick-up having a lens holder made by a material that has flexural elastic modulus of 10 GPa or more, has excellent vibration attenuation, and produces less burrs upon molding.

The optical pick-up of the present invention comprises a supporting shaft, and a lens holder which fits on the supporting shaft rotatably, wherein the lens holder is a resin molded product comprising a lens supporting part having a lens receiving surface, and a bearing part having a bearing surface disposed vertically to the lens receiving surface, and wherein the resin molded product comprises a gate at an end of the bearing part disposed at an opposite side of the lens receiving surface.

The lens holder for the optical pick-up is formed by injecting a resin from a gate provided on a gap between a cavity in the bearing part of a fixed template and a core pin. The resin material is distributed at a uniform pressure from a tip of the bearing part to a perimeter of the lens supporting part. As a result, a density unevenness in the bearing part can be avoided to enhance the roundness of the bearing surface in the lens holder.

Other optical pick-up of the present invention comprises a supporting shaft formed of ceramics containing zirconia, and a bearing part formed of a molded product of a liquid crystal resin composition or a polyphenylene ether resin composition having flexural elastic modulus of 10 GPa or more. With the above-described combination of the supporting shaft and the lens holder including the bearing part, the supporting shaft and the bearing part can be worked with high precision. The deflection and vibration of the lens holder upon driving control can be prevented. Thus, the gap between the supporting shaft and the bearing hole, i.e., the fit-on gap therebetween can be allowed to be 6 μm or less. Consequently, the objective lens can be supporterd at high dimensional accuracy, and thus optical beams can be focused on a high-density recording track. Since the resin material is the liquid resin composition or the polyphenylene ether resin composition, the resin material has low melt viscosity, and excellent moldability. Accordingly, there can be provided the lens bolder that produces less buns upon molding, and has excellent injection moldability.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENTS

Figure 1:
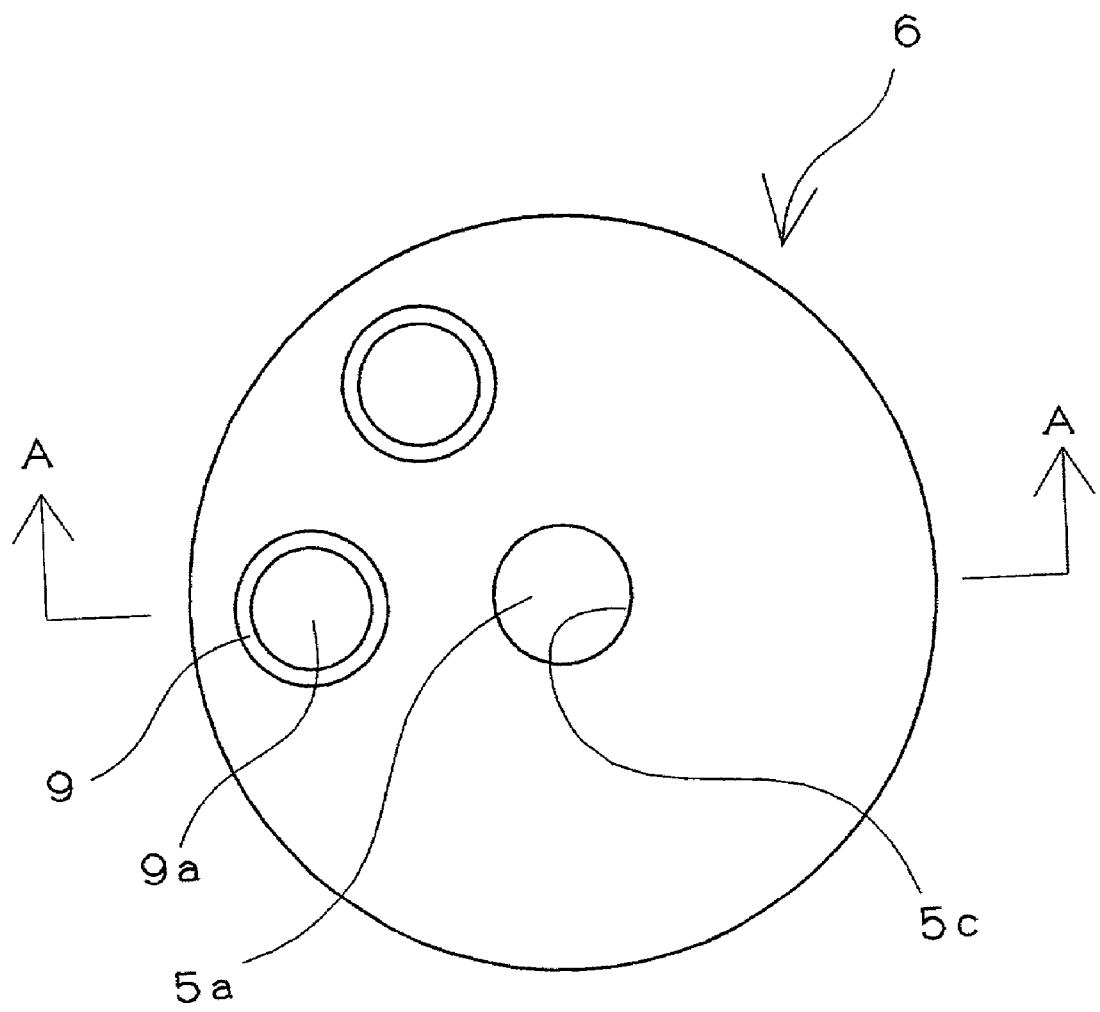
FIG. 1 is a plan view of a lens holder viewing from a surface of a lens supporting part (lens receiving surface) side.
Figure 2:
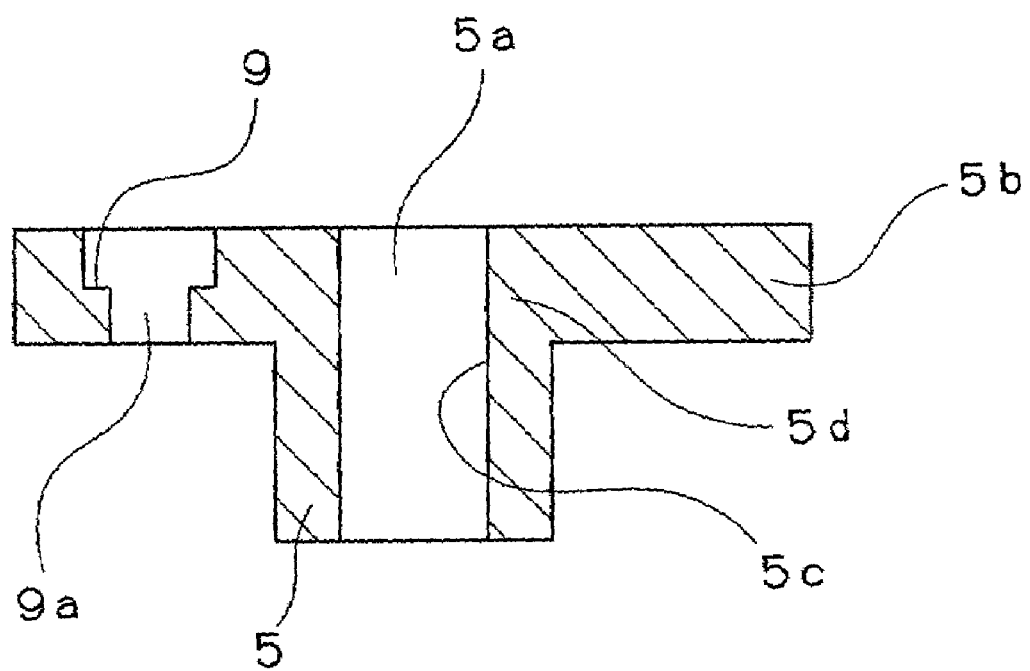
FIG. 2 is a sectional view of the lens holder along an A—A line of the lens holder shown in FIG. 1.

Referring to FIGS. 1 and 2, the optical pick-up and the lens holder according to the present invention will be described.

A lens holder 6 made of a resin composition has a lens supporting part 5b and a bearing part 5 that are joined by a bridge portion 5d. The lens supporting part 5b has a bearing hole 5a and a lens installing hole 9a. A lens receiving surface 9 is formed inside of the lens installing hole 9a. A bearing surface 5c in the bearing hole 5a is formed vertical to the lens receiving surface 9. The bearing part 5 is disposed at a center of the lens holder 6, and has a gate at a tip of the bearing part 5 opposite to the lens receiving surface. One or a plurality of lens installing holes 9a each having the lens receiving surface 9 is formed at an eccentric position of the bearing part 5 of the lens supporting part 5b.

Figure 3:
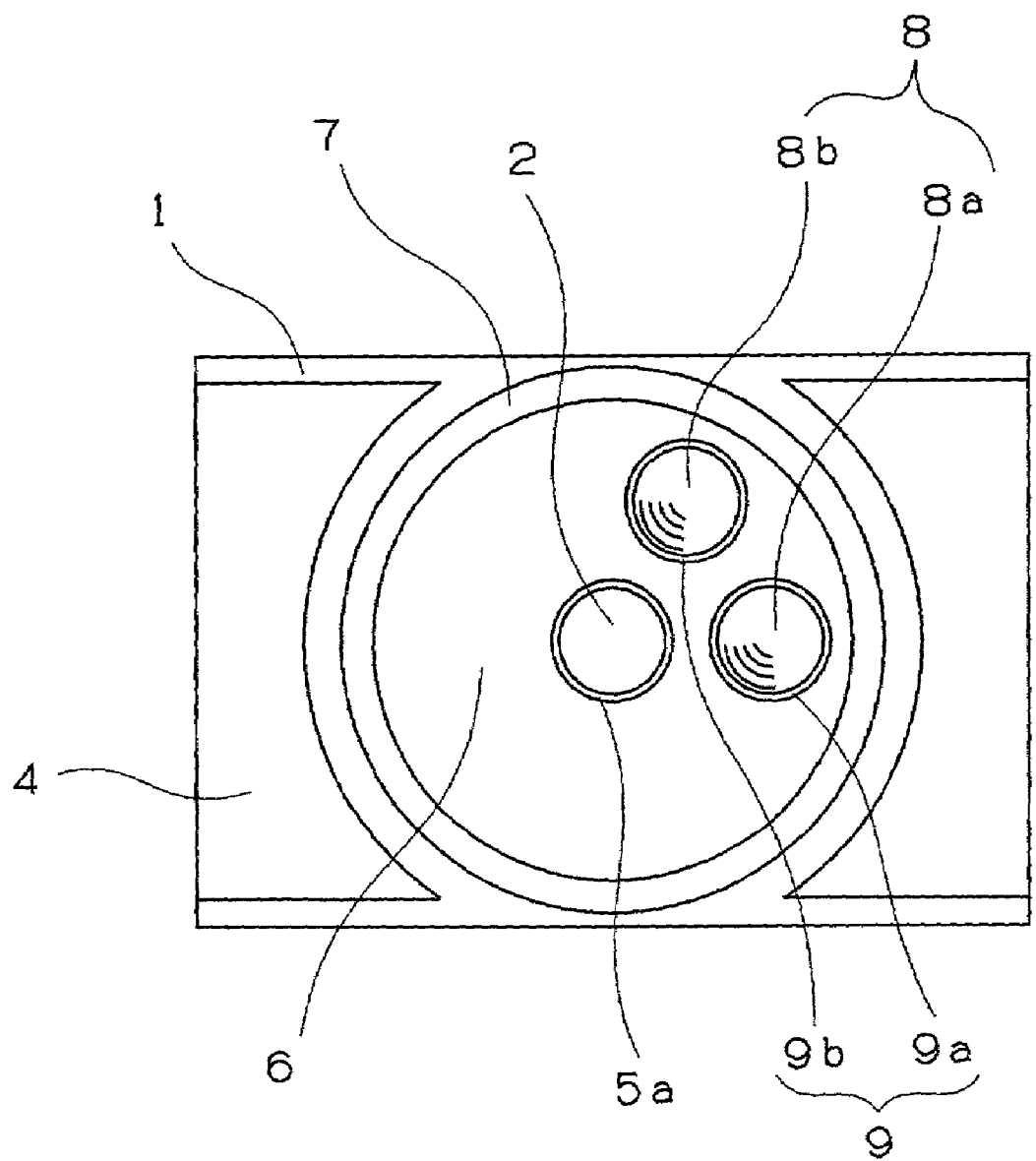
FIG. 3 is a plan view showing an example of an optical pick-up including two objective lenses.
Figure 4:
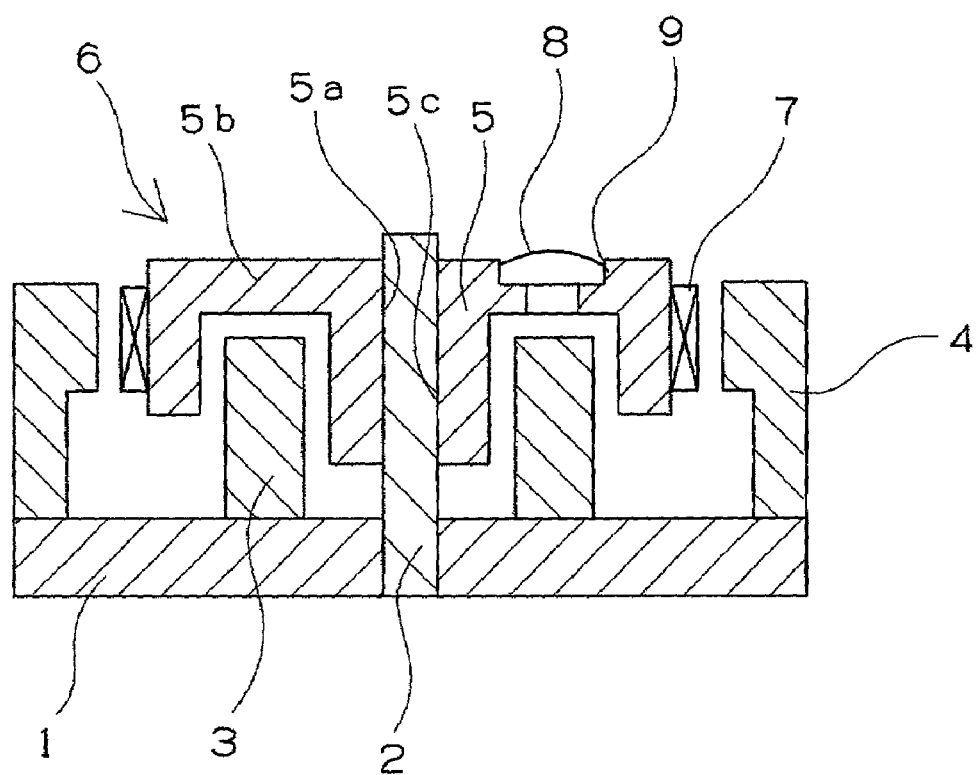
FIG. 4 is a partial sectional view of an optical pick-up.
Figure 5:
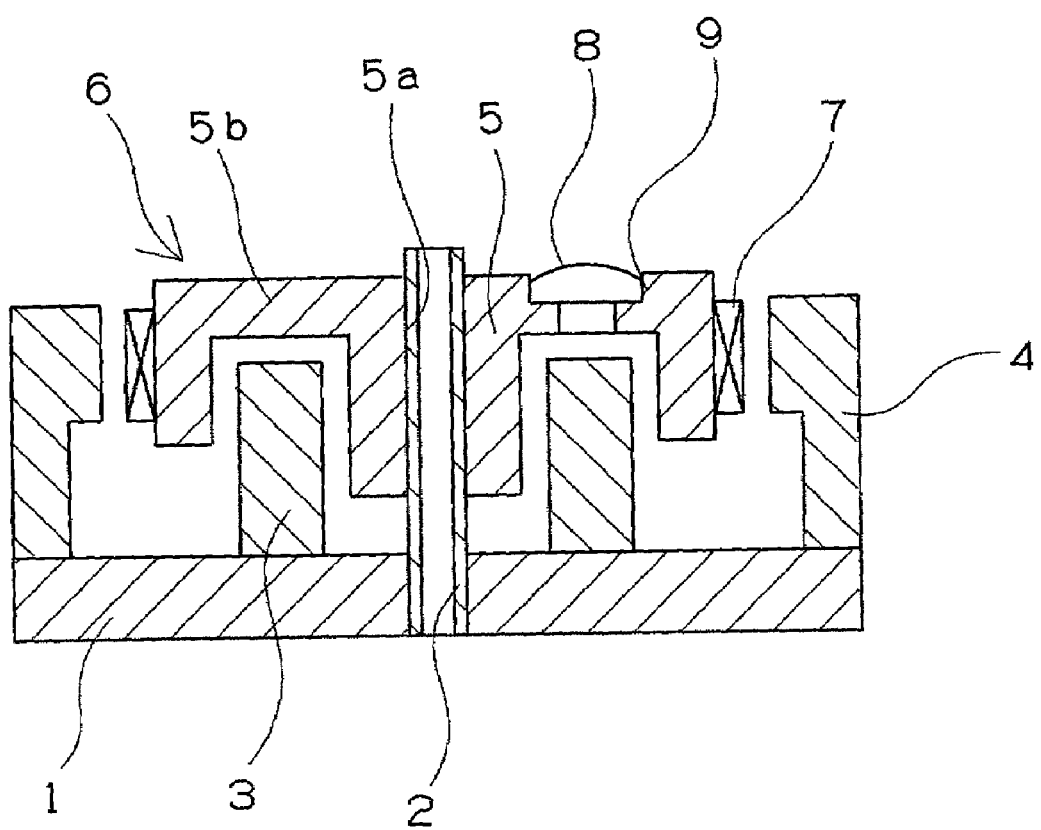
FIG. 5 is a sectional view of an optical pick-up including a cylindrical supporting shaft.

Referring to FIGS. 3 to 5, the optical pick-up including the lens holder 6 will be described.

As shown in FIGS. 3 and 4, the optical pick-up comprises at least a supporting shaft 2 disposed vertical to a base 1, and the lens holder 6 including the bearing part 5 which fit on the supporting shaft 2 rotatably and the lens supporting part 5b. The bearing part 5 includes a bearing surface 5c receiving a bearing hole 5a in the lens holder 6. The lens supporting part 5b is a different part from the bearing part 5 in the lens holder 6.

The base 1 disposes the supporting shaft 2, a core 3, and a magnet 4, and the lens holder 6 fits on the supporting shaft 2 rotatably. The bearing receiving hole 5a is disposed at a center of the lens holder 6, a driving coil 7 is disposed outside of the lens supporting part 5b, and lens installing holes 9a, 9b for installing a plurality of objective lenses 8a, 8b at an eccentric position of the bearing hole 5a are disposed at the lens supporting part 5b.

The driving coil 7 is constructed of a focusing coil wound on the periphery on the axis of the lens holder 6; and a tracking coil (not shown) wound on the periphery of the lens holder 6 in the orthogonal direction of the axis, and located at a position confronting each other, with a plane including the axis of the lens holder 6 set as a reference plane. The movement amount of the lens holder 6 in its axial direction and its rotation amount are controlled according to electric current flowing through the focusing coil and then tracking coil, respectively.

The optical pick-up of the present invention comprises the supporting shaft, and the lens holder including the bearing part which fits on the supporting shaft rotatably; the lens holder is the resin molded product comprising the gate at the end of the bearing part disposed at the opposite side of the lens receiving surface. The gate in the lens holder for injection molding is disposed at the end of the bearing part disposed at the opposite side of the lens receiving surface, thereby providing the lens holder on which the lens receiving surface and the bearing surface are formed vertically. As a result, the optical pick-up can have an optical axis with high accuracy.

In the lens holder, the gate is disposed parallel to an inside perimeter of the bearing part, whereby the resin flows smoothly to provide the lens holder without partial decrease in strength.

The optical pick-up of the present invention has the lens holder in which the lens receiving surface and the bearing surface are formed vertically, which leads to an optical axis with high accuracy. The optical pick-up is suitable for such optical pick-up having a plurality of objective lenses in one lens holder.

Examples of the resin forming the lens holder 6 include a liquid crystal resin such as wholly aromatic polyester resin, polyphenylene ether resin, nylon resin, polyphenylene sulfide resin, polyacetal resin, polyetheretherketone resin, polyethernitrile resin, a thermoplastic resin such as fluororesin. These synthetic resin can be used alone or in combination.

Among them, the liquid crystal resin and polyphenylene ether resin have excellent attenuation characteristic and are therefore suitable. Especially preferred are a liquid crystal resin composition and a polyphenylene ether resin composition that are improved to have high elastic modulus by addition of various compounding agents.

Examples of the liquid crystal resin for use in the present invention include aromatic polyester (liquid crystal polyester), aromatic polyester imide (liquid crystal polyester imide), aromatic polyester amide (liquid crystal polyester amide), polycarbonate (liquid crystal polycarbonate) that can form an anisotropic melting phase. It is preferable that the liquid crystal resin have a structure selected from the group consisting of the following repeated units (1), (2), (3), (4), (5), and (6) as its main component.

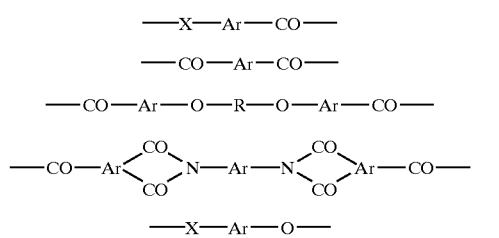

-continued

where Ar is a bivalent aromatic group containing at least one 6-membered carbocyclic ring, R is an aliphatic group or an alicyclic group, and X is O or NH.

The liquid crystal resin has as its main component either one component of the repeated unit (1) alone, or three components of the repeated unit (1), at least one of the repeated units (2) to (4), and at least one of the repeated units (5) and (6). In the latter case, it should meet the condition that the repeated unit (2)+the repeated unit (3)+the repeated unit (4)=the repeated unit (5)+the repeated unit (6) substantially on a mole % basis.

A preferred combination of the liquid crystal resins for use in the present invention is as follows: (1), (1)/(2)/(5), (1)/(2)/(6), (1)/(2)/(3)/(5), or (1)/(2)/(4)/(5). The combination (1)/(2)/(5) herein means substantially liquid crystal polyester or a polyester amide having the repeated units (1), (2) and (5) as repeated units in its main component. When the liquid crystal resin comprises the combination of three or four repeated units, 5 to 80 mole %, preferably 10 to 70 mole % of the repeated unit (1) is contained based on 100 mole % of the total repeated units, and a relation of the other structures is (2)=(5), (2)=(6), (2)+(3)=(5), and (2)+(4)=(5) substantially on a mole % basis. When the liquid crystal resin has an amide bond, or an imide bond, 1 to 90 mole %, preferably 5 to 60 mole % of the repeated units (3) or (4) is contained based on 100 mole % of the (2)+(3) or (2)+(4). In the repeated unit (1), specific examples of Ar include paraphenylene and 2,6-naphthalene.

The liquid crystal resin suitable for use in the present invention is the liquid crystal polyester (when X is O in the repeated units (1) and (5)) and the liquid crystal polyester amide (when X is NH in the repeated units (1) and (5)). More preferable liquid crystal resin is the liquid crystal polyester (when X is O in the repeated units (1) and (5)). Preferred liquid crystal polyester and liquid crystal polyester amide include (1), (1)/(2)/(5), (1)/(2)/(6), (1)/(2)/(3)/(5), or (1)/(2)/(4)/(5). Especially preferred is (1)/(2)/(4)/(5).

Other typical liquid crystal resins include the resin group having the structure represented by the repeated units (7) to (9).

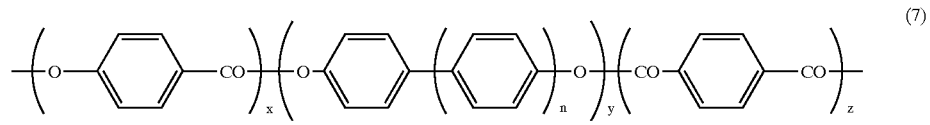

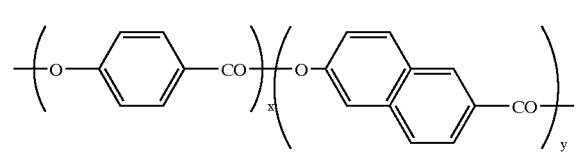

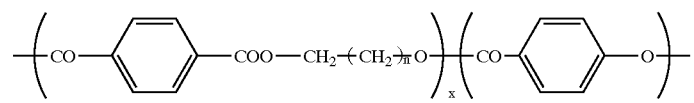

where n is 0 or 1, and each of x, y, z represents an arbitrary integer.

Any liquid crystal resin may be used as long as it forms an anisotropic melting phase, i.e., thermotropic liquid crystallinity.

Various types of polyphenylene ether resins can be used in the present invention. Examples include a homopolymer of 2,6-disubstituted phenyl represented by the repeated unit (10), an oxidized copolymer of 2,6-disubstituted phenol and multivalent phenol, and the like, which generally have a number average molecular weight of 2000 or more, preferably 10000 to 35000.

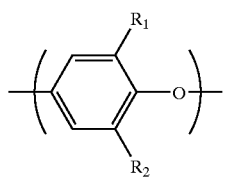

(10)

where $R_1$ and $R_2$ represent hydrogen; halogen; alkyl, haloalkyl, or alcoxy containing 4 or less carbon atoms; or allyl derivative, or an aralkyl group containing 9 or less carbon atoms.

The polyphenylene ether resin includes denatured polyphenylene ether resin. The denatured polyphenylene ether resin is a polymer alloy obtained by blending the above-mentioned polyphenylene ether resin with a polystyrene based resin such as crystal polystyrene resin, i.e., amorphous polystyrene resin and syndiotactic polystyrene resin. The denatured polyphenylene ether resin is preferable because it provides sufficient heat resistance, dimensional stability, and low specific gravity. Commercially available denatured polyphenylene ether resin in which the polystyrene based resin is blended is "Zylon" manufactured by Asahi Chemical Industry Co., Ltd., which may be blended with a flame retardant.

There can be used a denatured polyphenylene ether resin with heat resistance, and flame resistance that can be molded precisely. Various resins other than the polystyrene based resin can be blended. Examples include a thermoplastic polyester resin including a polyamide based resin, a polyethylene resin, a polyphenyl sulfide resin, or a polybutylene terephtalate resin.

In the liquid crystal resin composition or the polyphenylene ether resin composition for use in the present invention, the above-mentioned liquid crystal resin or the polyphenylene ether resin is blended with a fibrous filler, a flake filler, or a mixed filler. To improve sliding-contact characteristic, a fluororesin can be further blended therewith.

The fibrous filler for use in the present invention may be inorganic, or organic. Examples include glass fiber; graphite fiber; carbon fiber; tungsten core wire; so-called boron fiber, or silicon carbide fiber obtained by depositing boron or silicon carbide on carbon fiber; aromatic polyamide fiber; and various types of whiskers.

Preferably, the fibrous filler is selected from at least one of the carbon fiber, glass fiber and whiskers to provide a molded product with flexural elastic modulus of 10 GPa or more.

The fibrous filler has a fiber diameter of 0.01 to 50 μm, and a fiber length of 1 to 10000 μm. If the fiber diameter or the fiber length of the fibrous filler are too small or short, it is difficult to enhance mechanical strength. If the fiber diameter or the fiber length of the fibrous filler are too big or long, it is difficult to flow the resin composition, resulting in unfavorable low injection moldability.

Preferably, the fibrous filler has tensile strength of at least 1000 MPa or more, preferably 2000 MPa or more, in order to provide the lens holder with adequate stiffness, vibration proof, and resonance resistance. The upper limit of the tensile strength is not especially limited, but typical industrial fibers may have tensile strength of about 10000 MPa, specifically about 8000 MPa.

Any types of carbon fibers can be used regardless of types of raw materials including rayon, polyacrylonitrile (hereinafter referred to as "PAN"), lignin—poval mixture, and special pitch, as long as the carbon fiber can withstand a high temperature of 1000° C. or more, preferably 1200 to 1500° C. The carbon fiber may be long or short single fiber.

It is preferable that the carbon fiber for use in the present invention has a high tensile elastic modulus. Especially preferred is the PAN carbon fiber described below.

The PAN carbon fiber can be obtained by heating and firing acrylic fiber such as polyacrylonitrile. It is preferable that the PAN carbon fiber have tensile strength of 2500 to 3500 MPa, and tensile elastic modulus of 240 to 500 GPa. If values of the tensile strength and the tensile elastic modulus re below the respective lower limit, elasticity becomes poor to increase deflection, resulting in lowered reading accuracy. If these values exceed the respective upper limits, moldability is decreased, and the supporting shaft that is a mate for sliding may be attacked and worn.

The PAN carbon fiber has a mean fiber diameter of preferably 1 to 20 μm, more preferably 5 to 10 μm, a fiber length of about 10 to 1000 μm, preferably 10 to 500 μm, more preferably about 10 to 300 μm, and an aspect ratio of preferably 1 to 80, more preferably 5 to 50. If the mean fiber diameter of the PAN carbon fiber is less than 1 μm, the fiber agglomerates each other, and is difficult to be uniformly dispersed in the resin composition. If the mean fiber diameter of the PAN carbon fiber exceeds 20 μm, the flowability and the injection moldability are decreased. If the aspect ratio of the PAN carbon fiber is less than 1, a reinforcing effect of a matrix itself is interfered, and the mechanical characteristic is decreased. If the aspect ratio of the PAN carbon fiber exceeds 80, uniform dispersion upon mixing is extremely difficult, which may improve insufficiently wear resistance and therefore the quality may be decreased.

Examples of the PAN carbon fiber include "Besfite" (trade name) series manufactured by Toho Rayon Co., Ltd., i.e., Besfite HM35C6S, Besfite HTA-CMF-1000-E, Besfite HTA-C6-E, all of which has a fiber length of 7 to 8 μm; and "Toreka" (trade name) series manufactured by Toray Industries, Inc., i.e., Toreka MLD-300, and Toreka MLD-1000.

The glass fiber is obtained using inorganic glass containing as its main component $SiO_2$, $B_2O_3$, $Al_2O_3$, CaO, MgO, $Na_2O$, $K_2O$, $Fe_2O_3$, and the like. In general, no-alkali glass (E glass) and alkali glass (C glass, A glass) can be used. The no-alkali glass is preferable with an effect on the liquid crystal resin taking into consideration. Specifically, borosilicate glass is preferable since it contains little alkali components.

The glass fiber has tensile strength of about 2500 to 5000 MPa, and the no-alkali glass has tensile strength of about 3500 MPa on average. The glass fiber has elastic modulus of 70 to 90 GPa, and the no-alkali glass has elastic modulus of 74 to 77 GPa on average. In this regard, the no-alkali glass is comprehensively superior in the points of tensile strength, elastic modulus, mass production, and costs.

As the filler, the no-alkali glass fiber has a fiber length of preferably about 10 to 700 μm, more preferably 30 to 300 μm, and a fiber diameter of preferably about 5 to 15 μm, more preferably about 6 to 13 μm. If the no-alkali glass fiber has a fiber diameter of more than about 15 μm, and a fiber length of more than about 700 μm, it is difficult to be dispersed uniformly upon mixing with the resin, and to form a molded product with such non-uniformly dispersed composition. If the no-alkali glass fiber has a fiber diameter of less than 5 μm, and a fiber length of less than 10 μm, the flexural elastic modulus of the lens holder will be decreased to adversely affect reading accuracy. Examples of the glass fiber include GF-MF-KAC-L150, CS03DE404, MF06MB120, all manufactured by Asahi Fiber Glass Co., Ltd.

Any whisker can be used, as long as the whisker has a mean fiber diameter of 0.01 μm or more and less than 5 μm, preferably 0.05 to 3 μm, and a mean fiber length of 1 to 300 μm, preferably 1 to 50 μm. Such short fiber contributes to a surface smoothness as well as increased flexural elastic modulus. Also, it can prevent a production of burrs upon molding. Examples of the whiskers for use in the present invention include at least one selected from calcium sulfate whisker, aluminum borate whisker, magnesium sulfate whisker, short fiber synthetic calcium silicate hydrate whisker, barium titanate whisker, zinc oxide whisker, potassium titanate whisker, and titanium oxide whisker. The whisker can be used alone or in combination.

Especially, the aluminum borate whisker or the titanium oxide whisker is preferable for the lens holder according to the present invention, since it less concerns the decomposition of the liquid crystal resin.

These fibrous filler including the carbon fiber, the glass fiber, and the whisker may be surface-treated with a processing agent containing an epoxy resin, a polyamide resin, a polycarbonate resin, and a polyacetal resin; and a silane coupling agent in order to enhance adhesion between these fibrous fillers and the liquid crystal resin or the polyphenylene ether resin, and improve the mechanical characteristic of the lens holder.

The fibrous filler is contained in an amount of 5 to 60% by weight, preferably 20 to 40% by weight, and more preferably 25 to 35% by weight of the whole resin composition for the lens holder. If the fibrous filler is contained in an amount of less than 5% by weight, no mechanical strength can be obtained. If the fibrous filler is contained in an amount of more than 60% by weight, melt viscosity of the resin upon molding becomes too high, resulting in poor molding, and the mechanical strength will be improved no more.

Among these fibrous fillers, the whisker is preferable, with the surface smoothness of the lens holder, molding accuracy, and flexural elastic modulus taking into consideration.

The fibrous filler in the lens holder may be oriented randomly. This is based on the facts that the force is applied to the lens holder in every direction to be driven upon a focusing action and a tracking action; complicated sliding actions including a vertical motion and rotational motion are performed in the shaft hole of the lens holder; and adequate stiffness is needed for assembling the lens holder, i.e., attaching a winding coil for driving, and attaching a lens.

The flake filler for use in the present invention is in a shape of plate-like, or a scale-like, and has preferably a mean diameter of 1 to 30 μm. Examples of the plate-like, or scale-like filler with a mean diameter 1 to 30 μm include mica powder, talc power, and graphite. Such flake filler is blended for improved flexural elastic modulus. Also, the flake filler can ease anisotropy of the liquid crystal resin, and improve molding accuracy of the lens holder. It is preferable that the flake filler have a mean diameter within the range of 1 to 30 μm to provide good dispersibility and enhanced flexural elastic modulus. The flake filler is contained in an amount of 5 to 40% by weight of the whole resin composition.

When both of the fibrous filler and the flake filler are used, the total amount thereof preferably exceeds 20% by weight. The total amount is preferably 30 to 85% by weight. Within the range, melt viscosity of the resin upon injection molding will not unduly increase, and it can provide excellent flexural elastic modulus and durability.

The molded product comprising the above-mentioned compositions has flexural elastic modulus of 10 GPa or more, preferably 15 GPa or more, more preferably 17 GPa or more, and more, as measured in accordance with ASTM D790. Such molded product can provide the lens holder for the optical pick-up having excellent stiffness, vibration proof, and resonance resistance.

The upper limit of the flexural elastic modulus of the molded product comprising the above-mentioned compositions is 50 GPa or less, definitely 40 GPa or less, more definitely 37 GPa or less, and less, which depends on properties of various materials.

Examples of the fluororesin for use in the present invention include perfluoro resins such as tetrafluoroethylene resin (PTFE), tetrafluoroethylene-perfluoroalkylvinylether copolymer (PFA), and tetrafluoroethylene-hexafluoropropylene copolymer (FEP). Especially preferred is PTFE having low friction coefficient, noncohesiveness, heat resistance, chemical resistance, sliding-contact characteristic, and releasing properties from the injection mold.

The PTFE is preferable to enhance molding accuracy. This is because once the PTFE is fired, the effect on molding flowability can be reduced. Furthermore, the PTFE with low molecular weight by irradiating electron beams or gamma rays is more preferable, since it can more decrease the effect on the molding flowability.

It is preferable that the fluororesin be in a shape of powder which can be mixed into the composition uniformly, and have a mean particle diameter of 3 to 60 μm.

The fluororesin is contained in an amount of 0.5 to 20% by weight, preferably 1 to 20% by weight of the whole resin composition. Blending the fluororesin can suppress dispersion of friction coefficient between the supporting shaft and the lens holder. If the amount of the fluororesin exceeds 20% by weight, the flexural elastic modulus will be decreased. It is especially preferable that the amount of the fluororesin be 3 to 12% by weight, with the flexural elastic modulus and sliding-contact characteristic taking into consideration.

The above-mentioned resin composition may contain a compounding agent such as a pigment, a lubricant, a plasticizer, a stabilizer, an ultraviolet ray absorber, and a flame retardant; and an elastomer as required.

Also, it is preferable that a black pigment such as carbon black be contained therein to obscure a weld line.

As the supporting shaft of the optical pick-up, stainless steel and ceramics can be used. When the supporting shaft is made of stainless steel, a fluororesin is desirably coated on the surface of the supporting shaft to add lubricity thereon. When the supporting shaft is made of ceramics, any known ceramics can be used. Non-limiting examples of the ceramics include any known fine ceramics such as alumina (aluminum oxide) ceramics, zirconia ceramics, silicon carbide ceramics, and silicon nitride ceramics. Most suitable ceramics for the supporting shaft of the lens holder contains zirconia, which has high working accuracy.

Examples of the ceramics containing zirconia include zirconia containing a stabilizer, a complex ceramics of alumina and zirconia, and the like.

Examples of the stabilizer include yttria (yttrium oxide), ceria (cerium oxide), calcia (calcium oxide), magnesia (magnesium oxide) or a combination thereof. For the sake of high degree of strength, toughness, surface smoothness of the supporting shaft and the bearing part for the optical pick-up, it is especially preferable to use the stabilizer containing yttria as its main component.

The zirconia containing the stabilizer has excellent sliding-contact characteristic and wear resistance, whereby dimensional accuracy can be maintained for a long period of time. Further, the zirconia containing the stabilizer has excellent toughness, whereby breakage of component parts of the optical pick-up can be prevented when the supporting shaft for the optical pick-up is assembled.

Preferably, the amount of the yttria stabilizer is 2 to 5 mole %, and the amount of the ceria stabilizer is 5 to 14 mole %. Beyond the ranges, strength and toughness may be deteriorated, the stability of its tetragonal system may also be damaged, and they are therefore not suitable for the supporting shaft and the bearing part of the optical pick-up.

The stabilizer can contain calcia and/or magnesia in addition to yttria and/or ceria. If the amount of calcia and/or magnesia exceeds 10 mole % based on mole % of yttria and/or ceria, strength and toughness may be undesirably decreased.

The crystalline phase of the zirconia containing the stabilizer comprises mainly a tetragonal system and a cubic system. The content of the tetragonal system is 40% by volume or more, preferably 60% by volume or more. It is preferable that the crystalline phase of the zirconia containing the stabilizer comprises substantially no monoclinic system. "The crystalline phase of the zirconia containing the stabilizer mainly comprises the tetragonal system and the cubic system, and substantially no monoclinic system" herein means that 15% by volume or less of the monoclinic system is included, and the remaining volume is constituted of the tetragonal system and the cubic system. The percentage of the tetragonal system, the cubic system, and the monoclinic system can be calculated by irradiating X-ray to a polished surface of the zirconia containing the stabilizer using an X-ray diffractometer to determine diffraction intensity of each crystal plane. If the percentage of the tetragonal system is less than 40% by volume, strength and toughness will be undesirably decreased. If the percentage of the monoclinic system exceeds 15% by volume, uniformity of the stabilizer will be damaged. In this case, the stability of the tetragonal system decreases, thereby gradually increasing the monoclinic system for a long period of use. As a result, minor cracks and irregularities are produced on the surface of the zirconia containing the stabilizer. Thus, the supporting shaft made of the zirconia containing stabilizer having the crystalline phase beyond the above ranges may have a deteriorated smoothness.

The content percentage of each of the tetragonal system, the cubic system, and the monoclinic system in the crystalline phase is determined not only by the kind of the stabilizer and the addition amount thereof, but also by the uniformity of the stabilizer and the diameter of the particle of the tetragonal system. Thus, it is necessary to select zirconia satisfying the conditions in the crystalline phase. The particle diameter of the tetragonal system is preferably not more than 1 $\mu$m.

Not only the control of the addition amount of the stabilizer, but also the use of the zirconia to which alumina is added at not more than 40 vol % is effective for preventing the stability of the stabilizer of the tetragonal system from deteriorating.

Further, the zirconia containing the stabilizer can be added to other ceramics to modify the other ceramics into a material suitable for the supporting shaft for the optical pick-up.

For example, the zirconia containing the stabilizer can be added to alumina. In this case, 30 vol % or more of the zirconia containing the stabilizer is preferably added to the alumina. When the supporting shaft is formed with the alumina blended with the zirconia containing the stabilizer, a center line average roughness (Ra) and a maximum static coefficient of friction thereof can be reduced.

A smoothness of the surface of the supporting shaft and that of the bearing part for the optical pick-up is important, because they slide in contact with each other. The ceramics of the present invention containing zirconia do not substantially contain the monoclinic system, which causes generation of cracks and pores. Thus, it is possible to greatly prevent cracks and pores from being generated on the supporting shaft and the bearing part made of the ceramics containing the zirconia. Consequently, it is possible to allow the supporting shaft and the bearing part made of the ceramics containing the zirconia to have improved strength and wear resistance. Solid columnar supporting shaft and hollow cylindrical supporting shaft for the optical pick-up are required to have a uniform outer diameter, respectively, and the bearing part of the lens holder is required to have a uniform bore. The ceramics containing the zirconia allow them to have such required dimensional tolerances.

For example, in the case of the solid columnar supporting shaft 2 shown in FIG. 4 and the hollow cylindrical supporting shaft 2 shown in FIG. 5, supposing that the length of each of the supporting shafts 2 is 5–20 mm and the diameter of each thereof is 1.0 to 2.0 mm, the dimensional tolerance of the outer diameter thereof can be maintained at a tolerance range within 10 $\mu$m or preferably within 4 $\mu$m.

Regarding the dimensional accuracy of the supporting shaft and the bearing part formed of molded and sintered ceramics containing zirconia, polishing allows the cylindricity of the sliding-contact surface of each thereof to have a 6 $\mu$m or less finish and/or the center line average roughness (Ra) of the sliding contact surface of each thereof to have a 3 $\mu$m or less finish. By so polishing the ceramics that the supporting shaft and the bearing part have the above configuration, it is possible to enhance the dimensional accuracy of the fit-on gap between the supporting shaft 2 and the bearing part 5a shown in FIGS. 4 and 5.

In order for the sliding contact surface of the supporting shaft and the bearing part both made of the ceramics containing zirconia to have a center line average roughness (Ra) of 3 $\mu$m or less, it is necessary that the porosity of the ceramics containing zirconia is not more than 5%. As a method for decreasing the porosity, zirconia powder containing the stabilizer is processed by a normal pressure sintering method, a cold isostearic pressure press, a hot isostearic pressure press (HIP) or a hot press sintering method. The zirconia powder can be obtained by a chemical wet synthesizing method such as a co-precipitation method, a hydrolytic method or the like.

The polishing method can be carried out by a conventional well-known method. It is preferable to use centerless polishing method of polishing the peripheral surface of the supporting shaft 2 by rolling it, without holding an end portion thereof. This method can allow the ceramics containing the zirconia to have the above dimensional tolerances.

If the deviation from the cylindricity of the sliding contact surface of the supporting shaft 2 exceed 3 μm, it is difficult for the objective lens 8 to focus optical beams on a signal track. If the center line average roughness (Ra) of the sliding contact surface thereof exceeds 3 μm, a smooth movement thereof is prevented. As a result, response characteristic of the optical pick-up becomes poor. The most favorable the deviation from the cylindricity and the surface roughness can be obtained as they come closer to closer to 0 μm.

The deviation from the cylindricity means the degree of a difference of the cylindrical part from a geometric cylindrical surface. The deviation from the cylindricity is defined in JIS B 0812 as a value expressed by the difference between the radius of the smallest cylindrical surface and the radius of the largest cylindrical surface. The center line average roughness (Ra), which is defined in JIS B 0601, of the surface thereof means a center line average roughness (Ra) of the surface in the axial direction thereof.

The supporting shaft for the optical pick-up of the present invention can be made to be cylindrical. In the present invention, "cylindrical" means that the inside of a cylinder is coaxially hollow. That is, on a section perpendicular to the axis of the supporting shaft, concentric circles or polygons whose inner diameter is coaxial with the outer diameter. In order to prevent resonance at a high-frequency vibration, a cylinder whose inner diameter is coaxial with outer diameter is preferable. It is preferable that the thickness of the cylinder is 10 to 40% of the outer diameter thereof. The rigidity of the cylindrical supporting shaft is higher than that of the supporting shaft having other configurations. Consequently, the cylindrical supporting shaft has a high natural frequency and thus occurrence of resonance can be prevented.

Figure 6:
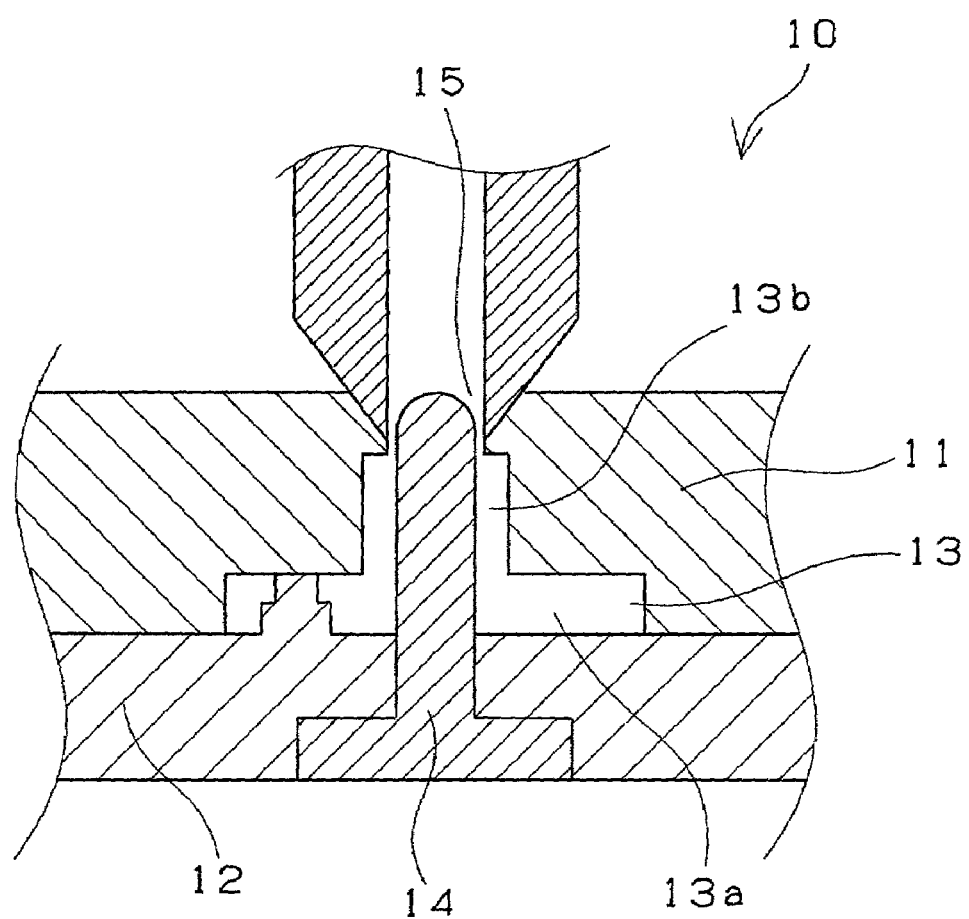
FIG. 6 is a partial sectional view of an injection mold for a lens holder.

Referring to FIG. 6, a method for producing the lens holder 6 will be described.

An injection mold 10 comprises a fixed template 11 and a moving template 12. A cavity 13 is formed between the fixed template 11 and the moving template 12. The cavity 13 comprises a cavity 13a forming a lens supporting part, and a cavity 13b forming a bearing part. The fixed template 11 includes a sprue and a runner (both are not shown) through which a resin material passes. The moving plate 12 includes an ejector pin (not shown) that is for removing a molded product, and also includes a core pin 14 that penetrate into a center of the cavity 13b. A gate 15 is formed between the cavity 13b of the fixed template 11 and the core pin 14.

When the fixed template 11 and the moving template 12 are abutted to close the injection mold 10, the core pin 14 can be held in the cavity 13 with the core pin 14 in the fixed template 11 unconstrained. The resin material is injected into the cavity 13 via the gate 15 between the cavity 13b and the core pin 14. As the gate 15 is disposed at around a tip of the core pin 14 and at a perimeter of the bearing part, the resin material injected flows uniformly into the cavity 13b, 13a, a lens receiving surface and a bearing part of the lens holder are vertical, and a turbulent flow of the resin is not produced at a bridge portion inside the cavity.

Figure 7:
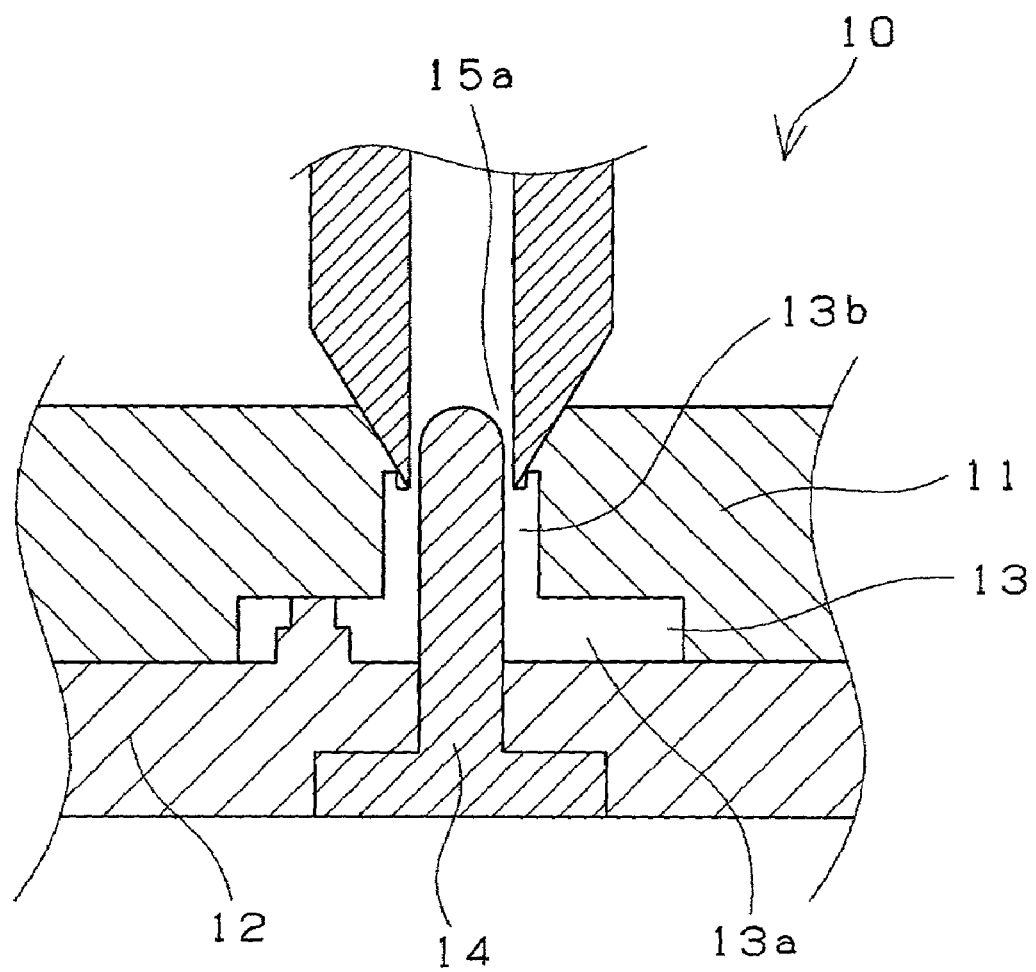
FIG. 7 is another partial sectional view of an injection molding for a lens holder.

As shown in FIG. 7, when a gate 15a is set inside of the perimeter of the bearing part, a length of the bearing part and an overall length of the lens holder can be favorably controlled.

A size of the gate port is selected so that the gate is easily cut in a removing step after the injection molding, and the resin material is injected smoothly into the cavity.

EMBODIMENT

Embodiment 1

The lens holder for the optical pick-up shown in FIG. 1 was injection molded using a liquid resin composition ("Vectora A230" manufactured by Polyplastics, Co., Ltd.; containing 30% by weight of carbon fiber as the fibrous filler) with the injection mold shown in FIG. 7. The bearing surface of the resultant lens holder had roundness of 1 to 2 μm, and standard deviation of 0.3 μm. The bearing part had no weld line.

Figure 8:
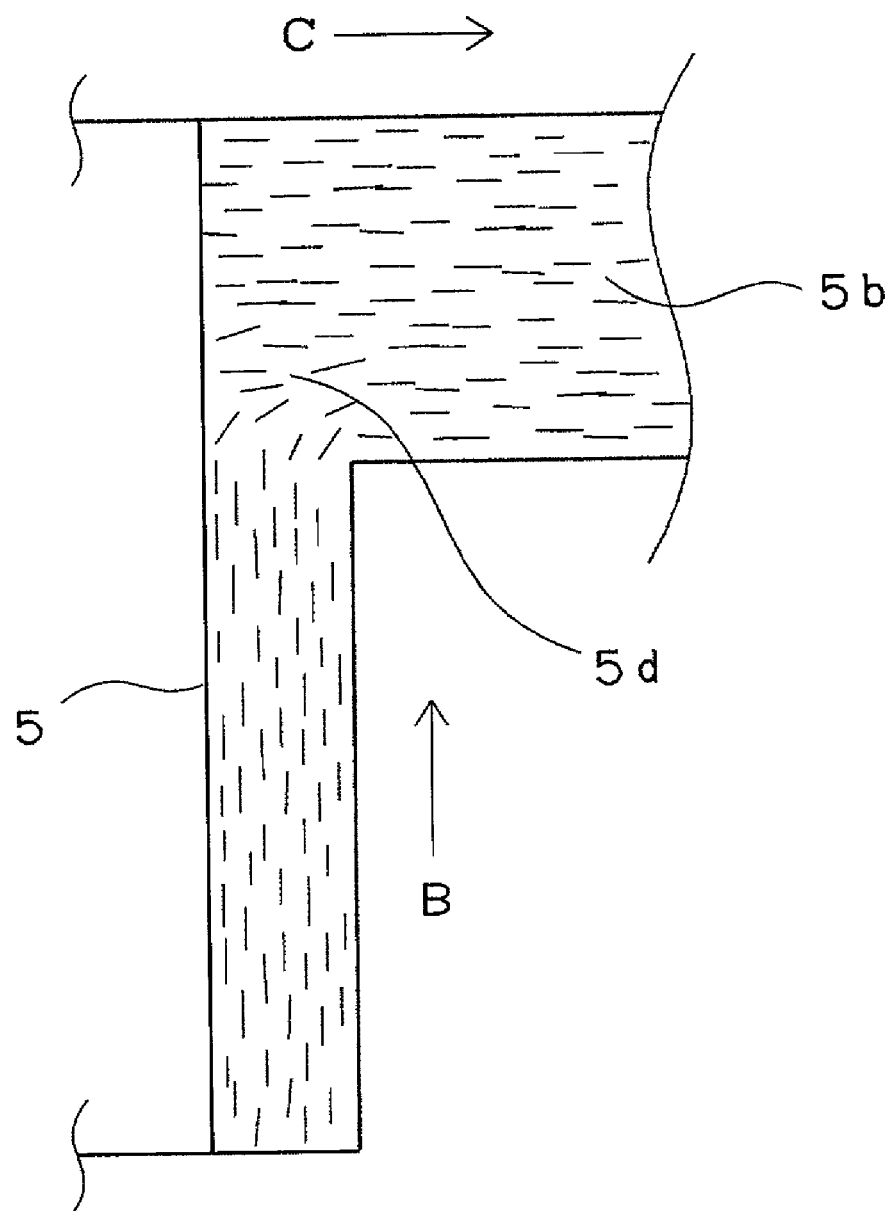
FIG. 8 shows an orientation of a fibrous filler.

An orientation of the carbon fiber in an axis direction (FIG. 2) was observed with a microscope. The result is shown in FIG. 8. The carbon fiber was oriented from an end of the bearing part disposed at an opposite side of the lens receiving surface to the lens supporting part (in FIG. 8, direction B), and then to a perimeter of the lens supporting part (in FIG. 8, direction C). In other words, the carbon fiber was oriented not to the axis direction of the bearing part 5, i.e., the direction B, but to the perimeter of the lens supporting part, i.e., the direction C, in the area of the lens supporting part 5b and the bridge portion 5d.

Comparative Embodiment 1

Figure 9:
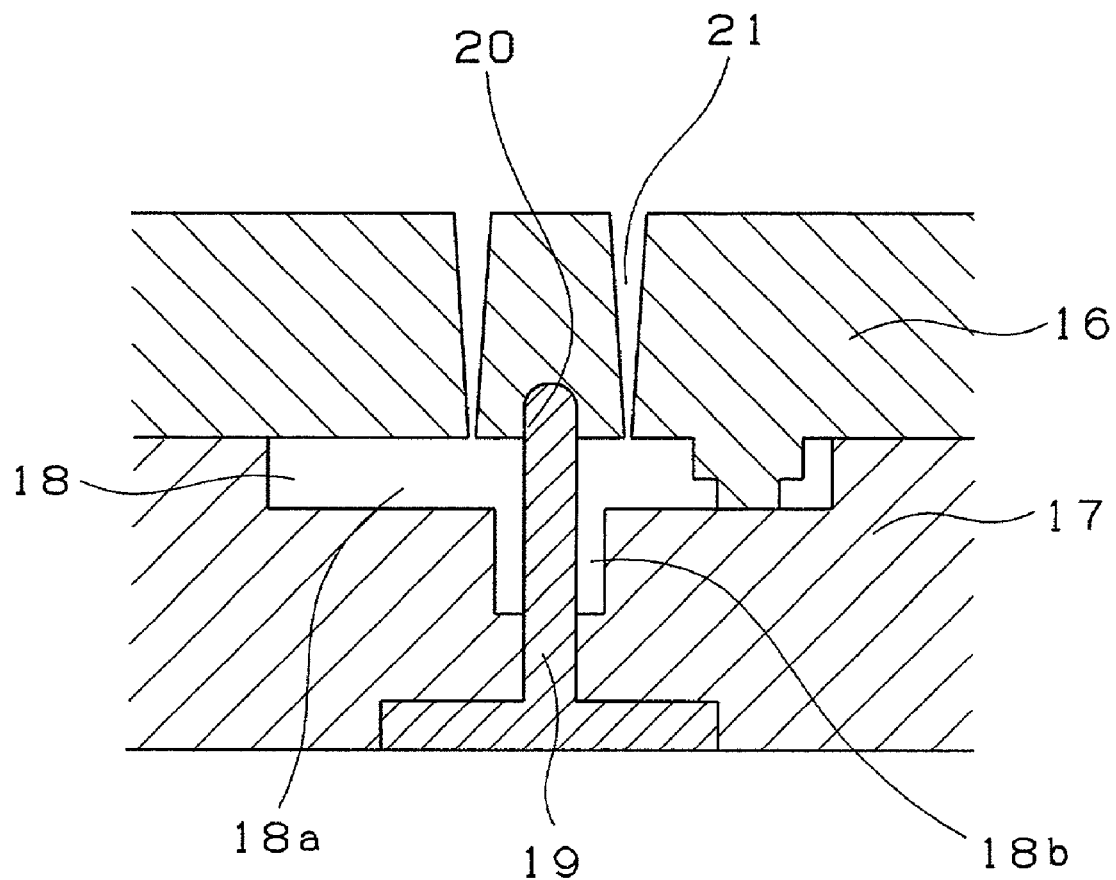
FIG. 9 is a partial sectional view of an injection molding including pin point gates for a lens holder.
Figure 10:
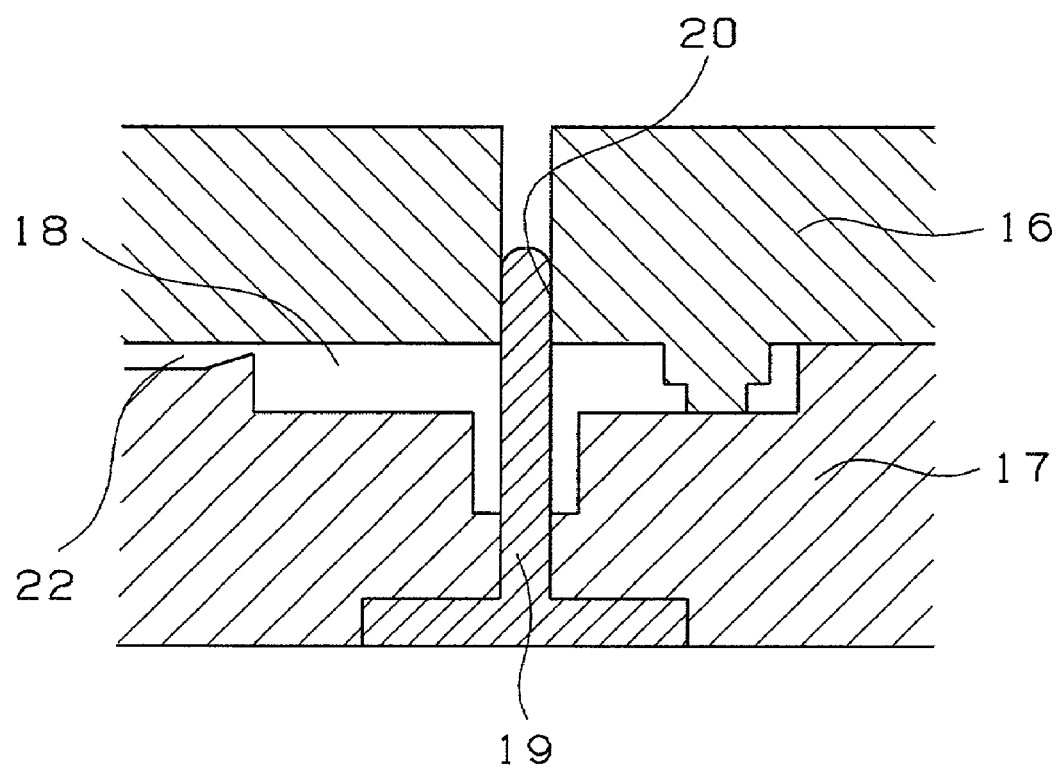
FIG. 10 is a partial sectional view of an injection molding including a side gate for a lens holder.

The lens holder for the optical pick-up shown in FIG. 1 was injection molded using the liquid resin composition used in Embodiment 1 with the pin gate type injection mold shown in FIG. 9. The bearing surface of the resultant lens holder had roundness of 5 to 7 μm, and standard deviation of 0.8 μm. The bearing part had explicitly the weld line. An orientation of the carbon fiber was observed as the same manner in Embodiment 1. As a result, it was verified that the carbon fiber was oriented at random on the bearing part and the lens supporting part.

The lens holder in Embodiment 1 was the resin molded product formed by injecting the resin via the gate disposed at the end of the bearing part disposed at the opposite side of the lens receiving surface, whereby the bearing surface has excellent roundness, and parallelism of lens receiving surfaces can be maintained with high accuracy. Consequently, parallelism of lens receiving surfaces can be maintained with high accuracy, even if the lens supporting part includes two or more lens receiving surfaces.

No weld line is produced on the bearing surface when the liquid crystal resin composition. As the liquid crystal composition contains the fibrous filler, there can provide excellent mechanical strength.

As the core pin is disposed unconstrained in the cavity of the fixed template, the gate is formed between the bearing part cavity of the fixed template and the core pin, and the resin is injected via the gate, the core pin is never slanted when the mold is closed, and the bearing surface is always formed vertical to the lens receiving surface. As a result, the lens holder produced by the above-described method according to the present invention can focus optical beams passed through the objective lens on the disc surface, whereby information can be easily written and detected. Thus, the lens holder functions thoroughly as the lens holder for the optical pick-up.

Embodiments 2 to 9

Raw materials used are as follows:
(The abbreviation of each material listed in TABLE 1 is in parenthesis, and the amount of each material listed in TABLE 1 is based on % by weight.)
(1) Liquid crystal resin (LCP), "Zider SRT900" manufactured by Nippon Petrochemicals Co., Ltd.

(2) Polyphenylene sulfide resin (PPS), "T4AG" manufactured by Toprene, Co., Ltd.
(3) Carbon fiber (CF), "Besfite HM35" manufactured by Toho Rayon Co., Ltd.
(4) Glass fiber (GF), "GF-MF-KAC-L150" manufactured by Asahi Fiber Glass Co., Ltd.
(5) Whisker (W1), "Alborex Y", aluminum borate whisker, manufactured by Shikoku Corp.
(6) Whisker (W2), "FTL 300", titanium oxide whisker, manufactured by Ishihara Sangyo Kaisha, Ltd.
(7) Fluororesin (F), "KTL610" manufactured by Kitamura, Ltd.
(8) Flake filler 1 (TALC), "Talc X50" manufactured by Nippon Talc, Co., Ltd.
(9) Flake filler 2 (MICA), "S325" manufactured by Canada Mica, Co., Ltd.
(10) Flake filler 3 (GRP), "ACP" manufactured by Nippon Graphite, Co., Ltd.

In each embodiment, the above-described raw materials in the ratio listed in TABLE 1 were fully mixed in a Henschel mixer, fed into a twin-screw melt extruder to be pelletized. The pellets were fed into the injection molder having a predetermined mold to form the lens holder on which the bearing part and the lens supporting part were formed integrally shown in FIG. 2 under predetermined conditions.

The supporting shaft was made with the ceramics containing zirconia (G in TABLE 1). The ceramics was prepared by a wet-laid mixing method of mixing 97 mole % of zirconia and 3 mole % of yttria to provide powder. The powder was press-molded using cold hydrostatic pressure forming to a shape of the supporting shaft, fired at 1400° C. under atmosphere for 2 hours. The molded product had an outside diameter of 1.50 mm, and a length of 10 mm, and was further centerless polished.

The resultant supporting shaft was measured for cylindricity and center line average roughness (Ra) with a contact surface roughness tester. Every supporting shaft had cylindricity of 1 μm or less, and center line average roughness (Ra) of 0.3 μm or less.

The lens holder and the supporting shaft were combined to assemble the optical pick-up. The optical pick-up was tested for as follows:

(1) Stiffness Test

Flexural elastic modulus was measured in accordance with JIS K 7171 using "Autograph AG5000A" manufactured by Shimadzu Corporation. The flexural elastic modulus needed for the lens holder is 10 GPa or more, and preferably 15 GPa or more. The results are shown in TABLE 1.

(2) Durability Test

A driving coil was wound around the lens holder to produce the optical pick-up shown in FIGS. 3 and 4. The optical pick-up was mounted on a test plate. A driving apparatus (manufactured by NTN engineering plastics Corp.) was connected to an applied voltage generator including a signal generator (manufactured by Advantest Corp under the trade name of Signal Generator TR98202). The driving coil 7 of the optical pick-up was applied a voltage of 0.5 V and a frequency of 20 Hz (sine wave) by the applied voltage generator. The lens holder 6 was driven at amplitude of ±1.5 mm. The operation was continued at room temperature. A measure of the durability is operating hours until the operation fails. When the good operation continued over 1000 hours, the operation was stopped at the point. The results are shown in TABLE 1. In TABLE 1, >1000 means that the operation was stopped at 1000 hours.

(3) Sliding-Contact Test

The optical pick-up subjected to the durability test for 500 and 1000 hours was installed to a lens holder displacement measurement apparatus including an optical actuator test head (manufactured by Advantest Corp under the trade name of TQ88091) and an analyzing recorder (manufactured by Yokokawa Hokushin Denki Co., Ltd. under the trade name of 3656). The driving coil 7 was applied a voltage of 0.1 V and a frequency of 0.1 Hz (delta wave) by an applied voltage generator including a driving apparatus (manufactured by NTN engineering plastics Corp.) and a signal generator (manufactured by Iwatsu Electric Co., Ltd. under the trade name of FG-35). According to the magnitude of differences between a waveform of the applied voltage and a response waveform of the lens holder (the more the both waveforms are similar, the better the lubricity is), the sliding-contact characteristic is evaluated as good (○), fair (Δ), and poor (×). The results are shown in TABLE 1.

(4) Static Friction Test

The lens holder was fixed on a specimen. The specimen was gradually raised at an angle using a tester including a goniostage and a goniameter. A coefficient of static friction was calculated based on the angle when the lens holder started to move. Two specimens of before testing and after 500 hours are tested. The bearing part of the lens holder had an inside diameter of 1.51 mm, and a weight of 0.5 kg. A maximum coefficient of static friction ($\mu_s$) was determined as follows: a submitted supporting shaft was inserted into the bearing hole of the lens holder. The supporting shaft was set horizontally. Then, the shaft was gradually slanted. A slanted angle (θ) was read when the lens holder started to move in the shaft direction. The maximum coefficient of static friction was calculated using the equation $\mu_s = \tan\theta$. The results are presented as the average of five measurements, and are shown in TABLE 1.

(5) Sliding Attenuation Test

The lens holder was suspended using a nylon wire having a diameter of 0.07 mm, and collided with an iron block having a weight of 30 g. A frequency of the sound at the collision was analyzed. A characteristic frequency thereof was measured to determine an attenuation time. The results are shown in TABLE 1.

Comparative Embodiments 2 to 4

A supporting shaft having the same shape in Embodiment 2 was produced using ceramics containing zirconia (G in TABLE 1) (Comparative Embodiment 2), alumina ceramics (A1 in TABLE 1) (Comparative Embodiment 3), or stainless steel (SUS402J, SUS in TABLE 1)

(Comparative Embodiment 4).

The resultant supporting shaft was evaluated as the same manner in Embodiment 2. The results are shown in TABLE 1.

TABLE 1

|  | Embodiment | | | | | | | | Comparative Embodiment | | |
|---|---|---|---|---|---|---|---|---|---|---|---|
|  | 2 | 3 | 4 | 5 | 6 | 7 | 8 | 9 | 2 | 3 | 4 |
| Composition (% by weight) | | | | | | | | | | | |
| LCP | 60 | 60 | 70 | 55 | 60 | 70 | 60 | 60 | — | 60 | 60 |
| PPS | — | — | — | — | — | — | — | — | 60 | — | — |
| CF | 30 | — | — | — | — | 30 | — | — | 20 | 30 | 30 |
| GF | — | — | — | — | — | — | 30 | — | — | — | — |
| W1 | — | 30 | — | 20 | 30 | — | 10 | 10 | — | — | — |
| W2 | — | — | 30 | — | — | — | — | — | — | — | — |
| TALC | 10 | — | — | — | — | — | — | — | 20 | 10 | 10 |
| MICA | — | — | — | 20 | — | — | — | 25 | — | — | — |
| GRP | — | — | — | — | 5 | — | — | — | — | — | — |
| F | — | 10 | — | 5 | 5 | — | — | 5 | — | — | — |
| Supporting shaft material | G | G | G | G | G | G | G | G | G | Al | SUS |
| Properties | | | | | | | | | | | |
| Flexural elastic modulus, GPa | 27 | 21 | 16 | 23 | 23 | 23 | 25 | 24 | 22 | 27 | 27 |
| Durability time, hr | >1000 | >1000 | >1000 | >1000 | >1000 | >1000 | >1000 | >1000 | >1000 | 100 | 50 |
| Sliding-contact characteristic test | | | | | | | | | | | |
| Before test | ○ | ○ | ○ | ○ | ○ | ○ | ○ | ○ | ○ | X | X |
| After 500 h | ○ | ○ | ○ | ○ | ○ | ○ | ○ | ○ | ○ | X | X |
| After 1000 h | ○ | ○ | ○ | ○ | ○ | ○ | ○ | ○ | ○ | X | X |
| Coefficient of static friction | | | | | | | | | | | |
| Before test | 0.13 | 0.11 | 0.13 | 0.11 | 0.11 | 0.11 | 0.13 | 0.12 | 0.16 | 0.18 | 0.15 |
| After 500 h | 0.13 | 0.11 | 0.13 | 0.10 | 0.10 | 0.10 | 0.13 | 0.11 | 0.15 | 0.16 | 0.14 |
| Vibration attenuation characteristic, ms | 25 | 20 | 22 | 26 | 23 | 20 | 32 | 26 | 92 | 25 | 25 |

As shown in TABLE 1, in Embodiments 2 to 9, there provide excellent properties including flexural elastic modulus, durability, sliding-contact characteristic, coefficient of static friction, and vibration attenuation characteristic. On the other hand, in Comparative Embodiments 2 to 4, there provide poor properties.

The optical pick-up of the present invention comprises the supporting shaft made of ceramics containing zirconia, and the lens holder made of the molded product of the liquid crystal resin composition having flexural elastic modulus of 10 GPa or more, whereby supporting accuracy between the lens holder and the supporting shaft is improved, and optical axis accuracy of the objective lens is correspondingly improved.

A combination of the lens holder made of the liquid crystal resin composition having high elasticity, sliding-contact characteristic, and sliding-contact attenuation characteristic, and the high precision supporting shaft made of the ceramics containing zirconia provides the high-precision optical pick-up having excellent durability, sliding-contact characteristic, and static friction characteristic.

The liquid crystal resin composition for producing the lens holder contains a predetermined filler, whereby sufficient flexural elastic modulus can be assured, and sliding-contact characteristic and static friction characteristic will not be damaged.

Embodiments 10 to 20, and Comparative Embodiments 5 to 7

In each embodiment, the above-described raw materials in the ratio listed in TABLE 2 were fully mixed in a Henschel mixer, fed into a twin-screw melt extruder to be pelletized. The pellets were fed into the injection molder having a predetermined mold to injection mold the lens holder shown in FIGS. 1 and 2 under predetermined conditions.

The resultant lens holder was tested for the following item (6) as well as the above-described items (1) to (5).

In the durability test and the sliding-contact test, the supporting shaft was a stainless steel (SUS402J) with a fluororesin coating (Bearee FL7090 manufactured by NTN engineering plastics Corp.).

(6) Burr Evaluation Test

Burrs at a mold mating face of the shaft hole of the lens holder that slides with the supporting shaft were observed with a light microscope, and the longest burr length was reported in $\mu$m. A diameter of the shaft hole was 1.5 mm.

A disk-like specimen having an outside diameter of 15 mm, an inside diameter of 1.5 mm, and a height of 3 mm was molded to verify standard deviation of the inside diameter.

TABLE 2

|  | Embodiment | | | | | | | | | | | Comparative Embodiment | | |
|---|---|---|---|---|---|---|---|---|---|---|---|---|---|---|
|  | 10 | 11 | 12 | 13 | 14 | 15 | 16 | 17 | 18 | 19 | 20 | 5 | 6 | 7 |
| Composition (% by weight) | | | | | | | | | | | | | | |
| LCP | 60 | 60 | 50 | 50 | 70 | 70 | 70 | — | — | — | — | — | — | — |

TABLE 2-continued

|  | Embodiment | | | | | | | | | | | Comparative Embodiment | | |
| --- | --- | --- | --- | --- | --- | --- | --- | --- | --- | --- | --- | --- | --- | --- |
|  | 10 | 11 | 12 | 13 | 14 | 15 | 16 | 17 | 18 | 19 | 20 | 5 | 6 | 7 |
| PPE | — | — | — | — | — | — | — | 50 | 50 | 65 | 65 | — | — | — |
| PPS | — | — | — | — | — | — | — | — | — | — | — | 60 | 70 | 60 |
| CF | 30 | 30 | 30 | 30 | 30 | — | — | — | 20 | 20 | — | 20 | 30 | — |
| GF | — | — | — | — | — | 30 | — | 30 | — | — | — | — | — | — |
| W1 | — | — | — | — | — | — | 30 | — | — | — | — | — | — | — |
| W2 | — | — | — | — | — | — | — | — | — | — | 30 | — | — | — |
| TALC | 5 | — | 20 | 10 | — | — | — | 15 | 20 | 15 | — | 20 | — | 40 |
| GRP | — | — | — | 10 | — | — | — | — | — | — | — | — | — | — |
| F | 5 | 10 | — | — | — | — | — | 5 | 10 | — | 5 | — | — | — |
| Properties |  |  |  |  |  |  |  |  |  |  |  |  |  |  |
| Burr length, $\mu$m | 15 | 10 | 10 | 12 | 13 | 18 | 12 | 13 | 16 | 13 | 11 | 150 | 180 | 210 |
| Inside diameter standard deviation, $\mu$m | 0.6 | 0.8 | 0.4 | 0.4 | 0.7 | 0.8 | 0.7 | 0.6 | 0.5 | 0.7 | 0.6 | 0.5 | 0.5 | 0.6 |
| Flexural elastic modulus, GPa | 24 | 20 | 30 | 29 | 23 | 16 | 15 | 17 | 20 | 21 | 18 | 25 | 18 | 20 |
| Durability time, hr | >1000 | >1000 | >1000 | >1000 | >1000 | >1000 | >1000 | >1000 | >1000 | >1000 | >1000 | >1000 | >1000 | 180 |
| Sliding-contact characteristic test |  |  |  |  |  |  |  |  |  |  |  |  |  |  |
| Before test | ○ | ○ | ○ | ○ | ○ | ○ | ○ | ○ | ○ | ○ | ○ | ○ | ○ | ○ |
| After 200 h | ○ | ○ | ○ | ○ | ○ | ○ | ○ | ○ | ○ | ○ | ○ | ○ | ○ | X |
| After 400 h | ○ | ○ | ○ | ○ | ○ | ○ | ○ | ○ | ○ | ○ | ○ | ○ | ○ | — |
| After 800 h | ○ | ○ | ○ | ○ | ○ | ○ | ○ | ○ | ○ | ○ | ○ | ○ | ○ | — |
| After 1000 h | ○ | ○ | ○ | ○ | ○ | ○ | ○ | ○ | ○ | ○ | ○ | ○ | ○ | — |
| Coefficient of static friction |  |  |  |  |  |  |  |  |  |  |  |  |  |  |
| Before test | 0.12 | 0.10 | 0.12 | 0.10 | 0.11 | 0.12 | 0.12 | 0.13 | 0.11 | 0.12 | 0.10 | 0.14 | 0.14 | 0.2 |
| After 200 h | 0.10 | 0.10 | 0.13 | 0.11 | 0.10 | 0.13 | 0.12 | 0.13 | 0.12 | 0.12 | 0.10 | 0.15 | 0.16 | 0.22 |
| Vibration attenuation characteristic, ms | 23 | 25 | 28 | 26 | 20 | 25 | 23 | 43 | 40 | 35 | 23 | 92 | 85 | 98 |

As shown in TABLE 2, in Embodiments 10 to 20, the burr length is short, and the flexural elastic modulus is high, which shows excellent moldability and mechanical characteristic. Also, in Embodiments 10 to 20, excellent results are obtained in the durability test, the sliding-contact test, the static friction test, the sliding attenuation test, and dimensional accuracy. In contrast, in Comparative Embodiments 5 to 7, the burr length is long, and the sliding-contact attenuation characteristic is low.

The lens holder for the optical pick-up of the present invention is a molded product of the resin composition containing the liquid crystal resin or the polyphenylene ether resin, and the fibrous filler, and the molded product has flexural elastic modulus of 10 GPa or more, whereby the lens holder has a high resonance point, less burr is produced upon molding, flexural elastic modulus is high, and excellent sliding-contact characteristic and attenuation characteristic are provided.

The fibrous filler for use in the present invention is at least one filler selected from the glass fiber and the whisker, and is used with the flake filler, whereby flexural elastic modulus of the molded product can be much more improved, and excellent surface smoothness and molding accuracy are provided.

The resin composition comprises the fluororesin, whereby the sliding-contact characteristic is improved and the supporting shaft is not attacked.

What is claimed is:

1. An optical pick-up comprising
a supporting shaft; and
a lens holder having a bearing part which fits on said supporting shaft rotatably;
wherein said lens holder is a resin injection molded product comprising a lens supporting part having a lens receiving surface, and said bearing part has a bearing surface disposed vertically to said lens receiving surface;
wherein said resin injection molded product comprises a gate at an end of said bearing part disposed at an opposite side of said lens receiving surface;
wherein said gate is disposed near a tip of a core pin and at a perimeter of said bearing part, and
wherein said gate is disposed between a cavity in a fixed template of an injection mold and the core pin for a bearing hole, said core pin is held in said cavity not in contacting any parts in the fixed template unconstrained, whereby said gate is disposed parallel to an inside perimeter of said bearing part and said bearing part has no weld line.

2. An optical pick-up according to claim 1, wherein a plurality of said lens receiving surfaces are disposed.

3. An optical pick-up according to claim 1, wherein said resin molded product is a liquid crystal resin composition or a polyphenylene ether resin composition.

4. An optical pick-up according to claim 3, wherein said resin molded product comprises at least one of a fibrous filler and a flake filler, and has flexural elastic modulus of 10 GPa or more.

5. An optical pick-up according to claim 4, wherein said fibrous filler is at least one selected from the group consisting of a whisker, a carbon fiber, and a glass fiber.

6. An optical pick-up according to claim 4, wherein said flake filler is at least one selected from the group consisting of mica, talc, and graphite.

7. An optical pick-up according to claim 1, wherein said supporting shaft comprises a ceramic.

8. An optical pick-up according to claim 7, wherein said ceramic comprises zirconia.

9. A lens holder for an optical pick-up comprising
a resin injection molded product comprising a lens supporting part having a lens receiving surface; and
a bearing part having a bearing surface disposed vertically to said lens receiving surface;
wherein said resin injection molded product is formed by injecting a resin from a gate disposed at an end of said bearing part disposed at an opposite side of said lens receiving surface,
wherein said gate is disposed near a tip of a core pin and at a perimeter of said bearing part; and
wherein said gate is disposed between a cavity in a fixed template of an injection mold and the core pin for a bearing hole, said core pin is held in said cavity not in contacting any parts in the fixed template unconstrained, whereby said gate is disposed parallel to an inside perimeter of said bearing part, and said bearing part has no weld line.

* * * * *